Figure 1:
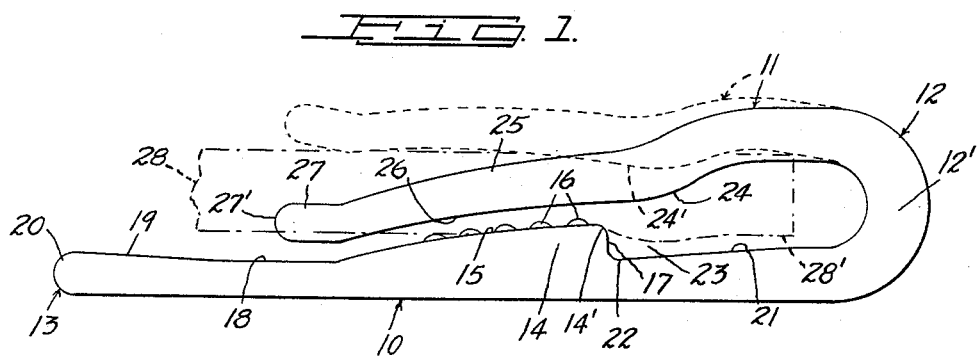

Jan. 28, 1964  K. W. MERFELD  3,119,163
PLASTIC GARMENT CLIP
Filed Jan. 9, 1963

INVENTOR.
KURT W. MERFELD
BY
Howard E. Thompson
ATTORNEY

United States Patent Office 3,119,163
Patented Jan. 28, 1964

3,119,163
PLASTIC GARMENT CLIP
Kurt W. Merfeld, Manhasset, N.Y., assignor to Kunreuther and Merfeld, New York, N.Y., a partnership
Filed Jan. 9, 1963, Ser. No. 250,328
2 Claims. (Cl. 24—255)

This invention relates to a molded garment clip designed for use in gripping and holding various types and kinds of elements and, particularly, garments in the support thereof. More particularly, the invention deals with a clip of the character defined having means on two relatively movable spring united members which cooperate in providing a secure gripping engagement of the clip with the article, garment or the like engaged thereby.

Still more particularly, the invention deals in a clip of the character defined, wherein a definite control is provided in the thicknesses and contour of the various members or parts of the clip to provide in the use thereof the desired and long lasting function, for which the clip is intended.

Figure 2:
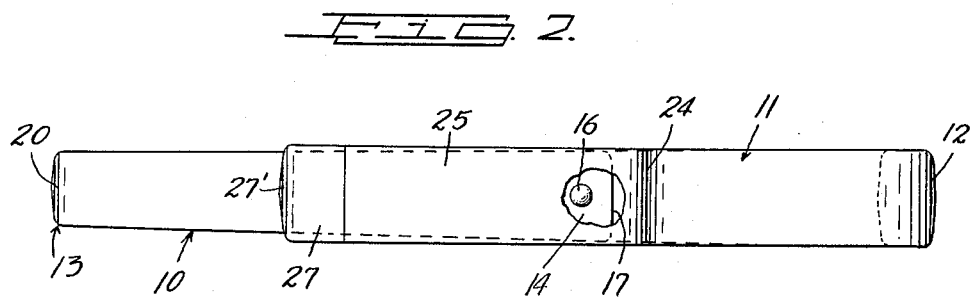

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is an enlarged side view of a clip made according to my invention and diagrammatically in dotted and dot-dash lines the engagement of the clip with an edge portion of a garment; and FIG. 2 is a plan view of the clip, as seen in FIG. 1, with part of the construction broken away.

The clip forming the subject matter of this invention is generally of the type and kind disclosed in Patent Number 2,960,742, granted November 22, 1960.

In illustrating one adaptation and use of my invention, I have shown in the accompanying drawing a molded plastic clip, comprising a long leg or member 10, a short leg or member 11, these legs or members being joined at one end in a rounded spring loop 12.

The member 10, or at least the outer surface thereof, is longitudinally straight, as will be clearly apparent from a consideration of FIG. 1 of the drawing and, in considering FIG. 2 of the drawing, this member is gradually contracted from the loop 12 to the end 13; whereas, the member 11 is of one common width throughout its length, in other words, has parallel side edges, as will be clearly apparent from a consideration of FIG. 2 of the drawing. The inner surface of the member 10 has a raised gripper portion 14, having a rounded surface 15 which is contracted in the direction of the end 13 of the member 10, as clearly seen in FIG. 1 of the drawing. On the surface 15 of the gripper 14 are longitudinally spaced projecting beads 16 to assist in gripping engagement with articles, in connection with which the clip may be employed. At 17 is shown a perpendicular inner wall on the gripper portion 14.

Outwardly beyond the end of the gripper portion 14, the member 10 has a straight relatively thin portion 18, from which extends an upwardly inclined surface 19 to form, at the end 13 of said member, a thickened rounded portion 20, as will clearly appear in FIG. 1 of the drawing. The inner portion of the member 10 has an upwardly inclined surface 21 extending in the direction of the loop 12 which forms, adjacent the gripper portion 14, a thinner wall portion, as at 22. At 23 is shown a chamber within the clip formed between the wall 17 and the loop 12 and the opposing member 11.

The member 11, which is generally curved throughout the major portion of its length, has, at a position adjacent but slightly rearwardly of the wall 17 of the member 10, an inwardly offset rounded gripper element 24. The member 11, as it extends from the loop 12 and into the gripper element 24, is substantially of one thickness throughout. However, it will be noted that the spring loop has a thicker portion 12' centrally thereof to give greater stability and strength to the loop, so as to resist any tensional strains to which the clip may be subjected. Extending from the gripper element 24 is a curved slightly contracted portion 25, the inner surface 26 of which substantially parallels the surface 15 of the gripper portion and is normally disposed in close proximity thereto. In the present showing, a distinct clearance is illustrated for clarity. The portion 25 terminates in an offset free end 27, which substantially parallels the straight portion 18 when the parts are in the non-use position, illustrated in full lines in FIG. 1.

In FIG. 1 of the drawing, I have diagrammatically illustrated at 28, in dot-dash lines, one edge portion of a garment engaged by the clip in diagrammatically illustrating the greater pressure or grip engagement of the clip with the garment between the rounded inner end 14' of the gripper portion and the inner rounded surface 24' of the gripper element, so that the enlarged non-gripped portion 28' of the garment is disposed within the chamber 23, as will appear from the dotted line showing of the member 11 in FIG. 1 of the drawing.

Considering FIG. 1 of the drawing, it will appear that the free end 27 is rounded, as indicated at 27' which, in combination with the rounded end 20 on the member 10, facilitates free coupling of the clip with a garment or other article in connection with which the clip is used.

Having fully described my invention, what I claim as new and desire to secure by Letters Patent is:

1. A clip of the character described comprising two members integrally joined in a spring loop, one member having a longitudinally straight outer surface, said member intermediate its ends having on the inner surface thereof a raised gripper portion with an inner curved surface contracted in the direction of the free end of said first named member, the inner end of the gripper portion having a perpendicular wall, the other companion member being curved throughout the major portion of its length, said companion member having adjacent and inwardly of the perpendicular wall of said gripper portion an inwardly curved offset gripper element, in the use of the clip said gripper element, in combination with the gripper portion, provides the greatest gripping engagement with an article positioned between said members, the curved companion member having a long contracted portion extending from the gripper element in the direction of the free end portion of said companion member, and said contracted portion having an inner curved surface substantially paralleling the curved surface of the gripper portion when the clip is not in use.

2. A clip as defined in claim 1, wherein the end portion of the first named member includes an upwardly and outwardly inclined longitudinally straight inner surface.

References Cited in the file of this patent
UNITED STATES PATENTS

| | | |
|---|---|---|
| D. 191,787 | Heil | Nov. 21, 1961 |
| 664,885 | McGrath | Jan. 1, 1901 |
| 843,960 | McCollum | Feb. 12, 1907 |
| 2,310,156 | Van Der Clute | Feb. 2, 1943 |
| 2,888,725 | Cudd | June 2, 1959 |

FOREIGN PATENTS

| | | |
|---|---|---|
| 869,393 | Great Britain | May 31, 1961 |
| 76,913 | Norway | May 30, 1950 |